(12) United States Patent
Bae et al.

(10) Patent No.: US 8,598,066 B2
(45) Date of Patent: *Dec. 3, 2013

(54) PREPARING PHOSPHORUS CONTAINING ALUMINA SUPPORT BY SOL-GEL METHOD FOR FISCHER-TROPSCH SYNTHESIS AND CATALYST PREPARATION THEREOF

(75) Inventors: Jong-Wook Bae, Daejeon (KR); Seung-Moon Kim, Daejeon (KR); Yun-Jo Lee, Daejeon (KR); Ki-won Jun, Daejeon (KR)

(73) Assignees: Korea Research Institute of Chemical Technology, Daejeon (KR); Daelim Industrial Co., Ltd., Seoul (KR); Korea National Oil Corporation, Gyeonggi-Do (KR); Hyundai Engineering Co. Ltd., Seoul (KR); SK Innovation Co., Ltd., Seoul (KR); Korea Gas Corporation, Gyeonggi-Do (KR)

( * ) Notice: Subject to any disclaimer, the term of this patent is extended or adjusted under 35 U.S.C. 154(b) by 707 days.

This patent is subject to a terminal disclaimer.

(21) Appl. No.: 12/594,695

(22) PCT Filed: Aug. 6, 2008

(86) PCT No.: PCT/KR2008/004569
§ 371 (c)(1),
(2), (4) Date: Nov. 17, 2009

(87) PCT Pub. No.: WO2009/031760
PCT Pub. Date: Mar. 12, 2009

(65) Prior Publication Data
US 2010/0130349 A1  May 27, 2010

(30) Foreign Application Priority Data
Sep. 4, 2007 (KR) .................. 10-2007-0089635

(51) Int. Cl.
*B01J 27/185* (2006.01)
*B01J 27/18* (2006.01)

(52) U.S. Cl.
USPC ............................ 502/213; 502/208; 502/439

(58) Field of Classification Search
USPC .......................... 502/208, 213, 439
See application file for complete search history.

(56) References Cited

U.S. PATENT DOCUMENTS

| 4,233,184 A | 11/1980 | Cull |
| 4,596,881 A | 6/1986 | Greco et al. |
| 7,071,239 B2 | 7/2006 | Ortego, Jr. et al. |
| 2005/0107479 A1 | 5/2005 | Espinoza et al. |
| 2006/0070915 A1* | 4/2006 | Euzen et al. ............... 208/111.3 |
| 2007/0017850 A1* | 1/2007 | Euzen et al. ............... 208/58 |
| 2009/0188834 A1* | 7/2009 | Euzen et al. ............... 208/111.3 |

FOREIGN PATENT DOCUMENTS

| EP | 0167215 A2 | | 1/1986 |
| GB | 634837 | * | 3/1950 |
| GB | 1510155 A | | 5/1978 |
| WO | 2007/009680 A1 | | 1/2007 |

OTHER PUBLICATIONS

International Search Report published Mar. 12, 2009 for PCT/KR2008/004569 filed Aug. 6, 2008.
Written Opinion of the International Searching Authority mailed Jan. 16, 2009 for PCT/KR2008/004569 filed Aug. 6, 2008.
International Preliminary Report on Patentability published Mar. 9, 2010 for PCT/KR2008/004569, filed Aug. 6, 2008.
Bezemer et al, Cobalt Particle Size Effects in the Fischer-Tropsch Reaction Studies with Carbon Nanofiber Supported Catalysts, J Am. Chem. Soc., 2006, p. 3956-3964, vol. 128, No. 12.
Iglesia, Design, synthesis, and use of cobalt-baed Fischer-Tropsch synthesis catalysts, Applied Catalysis A.: General 161 (1997) 59-98.

* cited by examiner

*Primary Examiner* — Elizabeth Wood
(74) *Attorney, Agent, or Firm* — Fleit Gibbons Gutman Bongini & Bianco; Martin Fleit; Paul D. Bianco (57) ABSTRACT

The present invention relates to a process of preparing of a phosphorus-containing phosphorus-alumina support by a sol-gel method and a cobalt/phosphorus-alumina catalyst where cobalt is supported onto the phosphorus-alumina support as an active ingredient. The phosphorus-alumina support is prepared by a sol-gel method and has wide specific surface area with bimodal pore size distribution and high cobalt dispersion, thereby enabling to increase heat and mass transfer, stabilize the structure by modifying the surface property of alumina and decrease the deactivation rate due to the reduced oxidation of cobalt component during the F-T reaction. When Fischer-Tropsch reaction (F-T) is conducted on the catalyst, the catalyst maintains a superior thermal stability, inhibits the deactivation due to water generation during the F-T reaction and also causes relatively high conversion of carbon monoxide and stable selectivity of liquid hydrocarbons.

2 Claims, 2 Drawing Sheets

Fig. 3

PREPARING PHOSPHORUS CONTAINING ALUMINA SUPPORT BY SOL-GEL METHOD FOR FISCHER-TROPSCH SYNTHESIS AND CATALYST PREPARATION THEREOF

TECHNICAL FIELD

The present invention relates to a process of preparing a phosphorus-containing alumina support by a sol-gel method, a catalyst for Fischer-Tropsch (F-T) synthesis where cobalt is supported on the support as an active ingredient, and a process of preparing liquid hydrocarbons on the catalyst by using synthesis gas (syngas) prepared by gasification (or reforming) of natural gas, coal and biomass.

BACKGROUND ART

Fisher-Tropsch (F-T) synthesis, one of the most important gas to liquid (GTL) techniques, was first introduced by German chemists, Fischer and Tropsch, who developed the process of producing synthesized fuel from synthesis gas by coal gasification. GTL process comprises three steps such as reforming natural gas, conducting F-T synthesis reaction from synthesis gas and hydrotreatment of F-T products. Among these, F-T reaction is conducted by using iron and cobalt as catalyst at 200-350° C. under 10-30 atm, and may be described with four main reactions as follows.

(a) Chain Growth in F-T Synthesis $CO + 2H_2 \rightarrow -CH_2- + H_2O \; \Delta H(227°\,C.) = -165 \text{ kJ/mol}$

(b) Methanation $CO + 3H_2 \rightarrow CH_4 + H_2O \; \Delta H(227°\,C.) = -215 \text{ kJ/mol}$ (c) Water Gas Shift Reaction $CO + H_2O \rightarrow CO_2 + H_2 \; \Delta H(227°\,C.) = -40 \text{ kJ/mol}$ (d) Boudouard Reaction $2CO \rightarrow C + CO_2 \; \Delta H(227°\,C.) = -134 \text{ kJ/mol}$ For the F-T reaction, iron-based or cobalt-based catalysts are commonly used. Although the iron-based catalyst was used in the past, nowadays the cobalt-based catalyst is mainly used for increasing the production of liquid fuel and wax and improving the conversion. The iron-based catalyst is the most low-priced one among various F-T catalysts and causes relatively less production of methane at high temperature and relatively high selectivity of olefins among hydrocarbons. Products may be used as fuel, and also be used as raw material in chemical industry such as light olefins and alpha olefins. Besides hydrocarbons, a large amount of side-products are produced such as alcohols, aldehydes and ketones.

Further, iron-based low-temperature F-T catalyst is commercially available from Sasol, which is used mainly for producing Sasol wax, comprises Cu and K components as promoters, and is prepared by a precipitation method using $SiO_2$ as a binder. High-temperature F-T catalyst from Sasol is prepared by melting magnetite, K, alumina, MgO, etc.

Although the cobalt-based catalyst is above 200 times higher-priced one than Fe catalyst, it has advantages in relatively high activity and stability, and also causes high yield of liquid paraffin based hydrocarbon, while producing relatively less amount of $CO_2$.

Further, this can be used as a low-temperature catalyst because a large amount of $CH_4$ is produced at high temperature, and should be well dispersed onto a stable support with high surface area such as alumina, silica and titania due to the high-priced cobalt. This is usually used in such a form that a small amount of noble metal promoters such as Pt, Ru and Re are additionally added.

The production of major products, straight-chain hydrocarbons is explained mainly by Schulz-Flory' polymerization kinetic scheme. In F-T process, products with higher boiling point than that of diesel fuel are first produced in the amount of more than 60%. Thus, diesel fuel is produced by processes following the hydrocracking process, and waxes are transformed into high-quality lubricant oil by dewaxing process.

A reforming process for treating reduced crude that applies to general oil refining plant has been improved so as to guarantee process reliability due to the improvement of catalyst and process technique. However, oil (or wax) from F-T synthesis is far different from raw material treated in a reforming process of oil refining plant in terms of shape, state and properties, and this difference requires an appropriate hydrocarbon reforming process to be selected. Examples of a process of treating primary products of F-T reaction include hydrocracking, dewaxing, isomerization and allylation. Major products of F-T reaction include naphtha/gasoline, middle distillate (high centane number), S- and aromatic-free liquid hydrocarbons, α-olefins, oxygenates, waxes and so on.

As a general method to disperse high-priced active ingredient, cobalt and other activity-promoting materials are added onto a support with high surface area such as alumina, silica and titania, thereby providing catalyst. Specifically, to improve the dispersion of cobalt, i.e., an active ingredient, a commercial catalyst is prepared by using the one-component or two-component (mixed) support. However, it has been reported that the activity of F-T reaction only changes slightly depending on the kind of the support when the particle size of cobalt is similar [Applied Catalysis A 161 (1997) 59]. On the contrary, the activity of F-T reaction has been reported to depend largely on the dispersion and particle size of cobalt component [Journal of American Chemical Society, 128 (2006) 3956]. However, there have been attempts to improve FTS activity and stability by pre-treating the surface of support, thereby changing the properties of supports.

For example, when cobalt-supported alumina is used, the surface property of gamma-alumina can change into boehmite, etc., by the water generation during the reaction. This increases the rate of cobalt component oxidation, and the activity and thermal stability of the catalyst can be decreased. As a way to overcome these problems, there has been reported a process of pre-treating alumina surface with silicon precursor, thereby increasing catalyst stability [PCT publication; WO 2007/009680 A1]. Furthermore, there is disclosed that the treatment of the surface with various metals such as magnesium, zirconium, barium, boron and lanthanum to increase hydrothermal stability of support [U.S. Pat. No. 7,071,239 B2]. Another way to improve the activity of F-T catalyst is a method the preparation of a porous bimodal pore-structured silica-alumina catalyst, thereby increasing the mass transfer rate of components with high boiling point produced during the F-T reaction [publication of U.S. patent application Ser. No. 20050107479 A1; Applied Catalysis A 292 (2005) 252].

However, these techniques contains complicated synthesis processes of materials such as a process of forming a porous bimodal pore-structured support by using polymeric substrate or by preparing alumina-silica supports with difference pore size and simply mixing them and a process of supporting active ingredients such as cobalt by using the porous bimodal pore-structured support.

Although silica support shows less strong cobalt-support interaction than alumina support, it causes the loss of cobalt species due to the formation of cobalt silicates and resulting in lowering F-T activity. A pre-treatment of silica surface with metal such as zirconium has been reported as an effective method to overcome this problem [European patent No. 0167215 A2; Journal of Catalysis 185 (1999) 120].

Although F-T catalysts prepared by the aforementioned processes have various specific surface areas, F-T reactivity is known as closely related to change in cobalt particle size, pore size distribution of support and reducibility of cobalt component. Processes have been reported for preparing F-T catalyst by using well-known methods on the support prepared by complicated synthesis processes.

DISCLOSURE OF INVENTION

Technical Problem

The present invention relates to a process of preparing of a phosphorus-containing phosphorus-alumina support by a sol-gel method and a cobalt/phosphorus-alumina catalyst where cobalt is supported onto the phosphorus-alumina support as an active ingredient. The phosphorus-alumina support is prepared by a sol-gel method and has wide specific surface area with bimodal pore size distribution and high cobalt dispersion, thereby enable to increase heat and mass transfer, stabilize the structure by modifying the surface property of alumina and decrease the deactivation rate due to the reduced oxidation of cobalt component during the F-T reaction. When Fischer-Tropsch reaction (F-T) is conducted on the catalyst, the catalyst maintains a superior thermal stability, inhibits the deactivation due to water generation during the F-T reaction and also causes relatively high conversion of carbon monoxide and stable selectivity of liquid hydrocarbons.

Technical Solution

The present invention relates to a process of preparing phosphorus-alumina support for Fischer-Tropsch synthesis, the process comprising:

preparing an aluminum alkoxide solution by mixing an aluminum alkoxide in an alcohol-based organic solvent;

preparing a phosphorus-containing boehmite sol by mixing 0.01-1 moles of an organic carboxylic acid with pKa of 3.5-5 and 2-12 moles of water relative to one mole of the aluminum alkoxide in the aluminum alkoxide solution relative to one mole of the aluminum and adding 0.001-0.4 moles of a phosphorus precursor, followed by heating the solution at 80-130° C.;

preparing a powdery phosphorus-containing boehmite by distilling and drying the phosphorus-containing boehmite sol to separate and recover alcohol; and preparing a phosphorus-alumina support by calcining the powdery boehmite at 300-800° C.

BEST MODE FOR CARRYING OUT THE INVENTION

In a usual F-T reaction for preparing liquid hydrocarbons using synthesis gas, a catalyst is prepared by using a support with a high surface area such as alumina, silica and titania to disperse high-priced active ingredient, and adding promoting components along with cobalt, an active ingredient. However, the prepared catalyst has drawbacks of a decrease in dispersity and redwing power of cobalt and rapid deactivation of catalyst due to the water generation in the reaction.

In particular, when most-widely used alumina is used for support, surface properties of γ-alumina can be partially changed into boehmite, etc due to the water generation during F-T reaction. Reportedly, this increases the rate of cobalt oxidation, and thereby decreases the activity and thermal stability of catalyst. To overcome these problems, there have been attempts made to minimize the change of alumina surface by adding various metals (e.g. boron, zirconium, alkaline earth metal and lanthanium) as a structure stabilizing agent such in the support, thereby achieving long-term stability of catalyst.

Therefore, the present invention for manufacturing liquid hydrocarbons from synthesis gas provides an optimized method of preparing a phosphorus-alumina support by an F-T reaction, where the change of alumina surface property caused by generated water during the F-T reaction is controlled by the addition of phosphorus, thereby inhibiting cobalt oxidation, facilitating heat and mass transfer by using porous bimodal pore-structured support, increasing hydrothermal stability of catalyst in F-T reaction and decreasing catalyst deactivation rate.

A support comprising two different components is prepared by impregnation, co-precipitation, sol-gel method, etc. In the present invention, a phosphorus-alumina support is prepared by a sol-gel method. During synthesis of alumina, a phosphorus precursor is incorporated to the surface and structure of alumina, thus remarkably increasing the additive effect of a phosphorus. In particular, the sol-gel method is advantageous in that the decrease in specific surface area of alumina is negligible during the incorporation of phosphorus, and enables the preparation of porous bimodal pore-structured phosphorus-alumina support, thereby resulting in higher specific surface area of support than the general impregnation and co-precipitation methods. Further, surface modification effect of alumina support and the dispersion of cobalt increase, thereby improving the hydrothermal stability of catalyst and the dispersion of active ingredient, and also ensuring the catalyst stability by the oxidative rate of catalyst due to the water generated during the F-T reaction.

Hereunder is provided a detailed description of a process of preparing a phosphorus-alumina support for F-T synthesis according to the present invention. First, an aluminum alkoxide solution is prepared by mixing aluminum alkoxide in an alcohol-based organic solvent. Although the hydrolysis of aluminum alkoxide has been studied particularly in aqueous solution, this has the following disadvantages: the recovery of alcohol generated from alkoxide is difficult; the drying of alumina in aqueous solution requires more energy; and alumina nano-crystals coagulate during drying process due to capillary pressure, and this inhibits the formation of hollow or macro pores, thereby drastically deteriorating the function of catalyst or absorbent. However, alcohol is lower than water in capillary pressure and coagulation property, and the use of alcohol as in the present invention facilitates the development in hollow or macro pores of alumina.

As an alcohol-based organic solvent, lower alcohol in the range of C1-C4 having a boiling point of lower than 150° C. considering the solubility in alkoxide and facile removal. Examples of such alcohol include methanol, ethanol, 1-propanol, 2-propanol, 1-butanol, 2-butanol, 2-methylpropanol, etc. Alcohol is used in the amount of 5-200 moles relative to one mole of aluminum alkoxide. When the amount is less than 5 moles, it may be difficult to dissolve aluminum alkoxide in alcohol. When the amount is more than 200 moles, the reaction efficiency and economical efficiency can be lowered.

Reaction is conducted at 80-130° C. When the temperature is lower than 80° C., the growth rate of boehmite crystals may be lowered and aluminum hydroxide such as gibbsite may be formed as impurities. When the temperature is higher than 130° C., boehmite crystal may excessively grow.

Then, an organic carboxylic acid having pKa of 3.5-5 and water are mixed in the aluminum alkoxide solution, and added with a phosphorus precursor [P/Al] in a molar ratio of 0.001-0.4, followed by heating the mixture to provide a phosphorus-containing boehmite sol. At this time, hydrolysis is rapidly caused by water, and while amorphous aluminum hydroxide precipitates in alcohol, while peptization is promoted by the organic add, thereby forming nano-sized boehmite sol.

The boehmite sol serves an important factor affecting crystal size and crystallinity depending on the kind and the amount of add and reaction temperature. Thus, in the present invention, a weak organic carboxylic acid with pKa of 3.5-5 is used. Examples of the acid include formic add, acetic add and propionic acid. The organic carboxylic add is used, relative to a mole of aluminum alkoxide, in the amount of 0.01-1 moles, more preferably 0.01-0.5 moles. When the amount is less than 0.01 moles, the aimed effect may be negligent. As the add amount increases, the crystal size of boehmite decreases and gel becomes transparent. This is because, with the increase in the add amount, the peptization of aluminum hydroxide formed by the hydrolysis of aluminum alkoxide rapidly proceeds at the same time. Thus, more boehmite nucleus are formed and the crystal size become smaller. Therefore, it is easy to control the properties of boehmite such as crystal size, specific surface area and porosity by means of the amount of acid added. However, the amount is more than 1 mole, aluminum can bind with an organic carboxylic add to form aluminum tricarboxylate. Organic acid is preferred to inorganic acid in that it can be easily removed even at a relatively lower drying temperature and that there is no change in structure and crystalline phase of thus-produced boehmite.

Water is used in as small amount as possible, preferably in the amount of 2-12 moles, for conducting hydrolysis. When water amount is less than 2 moles relative to a mole of aluminum alkoxide, hydrolysis barely proceed. When the amount is more than 12 moles, the separation and recovery of it may requires a complicated process.

Any conventional phosphorus precursor can be used in the present invention.

Examples include phosphoric add ($H_3PO_4$), phosphorus oxychloride ($POCl_3$), phosphorus pentoxide ($P_2O_5$), phosphorus trichloride ($PCl_3$) and a mixture thereof. The phosphorus precursor is used in such an amount as to maintain the molar ratio [P/Al] within 0.001-0.4, preferably 0.01-0.3. When the molar ratio is lower than 0.001, the increase in hydrothermal stability of phosphorus-alumina support caused by the addition of phosphorus is negligible, and the deactivation rate of catalyst may be insufficiently decreased. When the molar ratio is higher than 0.4, the specific surface area of phosphorus-alumina support may be remarkably decreased, thus lowering dispersion of cobalt.

The heating is conducted at 80-130° C. for 1-48 hours. When the temperature is lower than 80° C., the growth of boehmite crystal may become slow, and aluminum hydroxide such as gibbsite can be formed as impurities. When the temperature is higher than 130° C., boehmite crystal can excessively grow. Time shorter than 1 hour is insufficient for the formation of boehmite crystal. When the time is longer than 48 hours, reaction efficiency and economical efficiency can deteriorate.

Powdery phosphorus-containing boehmite is prepared by distilling and drying phosphorus-containing boehmite sol to separate and recover alcohol. It can be dried as conventionally conducted, for example by vacuum drying and spray drying methods, preferably at 100-150° C. Alcohol is preferred as a reaction solvent because it can be dried at lower temperature than the conventional water solvent. The alcohol separated and recovered in the drying process is those that is used as a solvent in the reaction or produced in hydrolysis. This barely comprises water and is highly pure, and can be recycled and reused in a subsequent reaction.

As a next step, a powdery boehmite is calcined at 300-800° C., preferably 400-700° C. to prepare a phosphorus-alumina support. When the temperature is lower than 300° C., the additive effect of phosphorus can be negligible because alumina surface can be insufficiently modified by phosphorus and possible phase transition of alumina can be caused by the water generated during F-T reaction. When the temperature is higher than 800° C., FTS reactivity may be lowered due to the decrease in specific surface area of phosphorus-alumina support and resulted in low dispersion of cobalt component.

Thus prepared phosphorus-alumina support has a specific surface area of 300-500 $m^2/g$. The ratio of $SA_1$ to $SA_2$ ranges 5-10, where $SA_1$ is the specific surface area of relatively smaller pores of 1-20 nm and $SA_2$ is the specific surface area of relatively larger pores of 21-200 nm. This porous bimodal pore-structured support shows such a tendency that the catalyst deactivation during the F-T reaction is inhibited because the dispersity of cobalt as the ratio of the relatively smaller pores increases and the presence of relatively larger pores facilitates the easy heat and mass transfer. This tendency is achieved by the manufacture of a phosphorus-alumina support by a sol-gel method according to the present invention. Thus prepared support is advantageous over those prepared by the conventional impregnation and co-precipitation methods in the improved dispersion of cobalt species on the support and wider specific surface area with bimodal pore-structured support. Phosphorus decreases the oxidation of cobalt due to water generation during the F-T reaction, thereby increasing hydrothermal stability and lowering initial rate of catalyst deactivation.

When the specific surface area of the phosphorus-containing alumina support is lower than 300 $m^2/g$, the dispersion of cobalt may decrease because the specific surface area drastically declines during the impregnation of cobalt. When the specific surface area is higher than 500 $m^2/g$, the structure deformation of support may occur during the reaction due to relatively lower thermal stability of a phosphorus-containing alumina support. Further, the [$SA_1/SA_2$] is lower than 5, the dispersion of cobalt may decrease because the specific surface area of catalyst decrease due to the relatively larger pores of 21 nm or higher. When the ratio is higher than 10, the dispersion of cobalt may also decrease because pores may be blacked during the impregnation of cobalt due to the relatively smaller pores of 20 nm or lower.

The present invention also relates to a cobalt/phosphorus-alumina catalyst for F-T reaction prepared by using a phosphorus-alumina support prepared by a sol-gel method.

The catalyst may be conventionally prepared, for example, by impregnating cobalt into the phosphorus-containing powdery alumina support, followed by calcination, or by impregnating cobalt into the calcined phosphorus-alumina support, followed by calcination.

In the present invention, for example, cobalt precursor is impregnated in a calcined phosphorus-alumina support, and calcined at 200-700° C., preferably 300-600° C. A catalyst is conventionally prepared, and for example the impregnation may be conducted according to conventional impregnation and co-precipitation. Specifically, the impregnation method is conducted at 40-90° C. in aqueous alcohol solution, and the precipitates are washed, dried in an oven of 100° C. or higher for about 24 hours, and used as a catalyst.

Further, a co-precipitation method is conducted by co-precipitating cobalt precursor in slurry of a phosphorus-alumina support under aqueous solution of pH 7-8 and ageing the precipitates at 40-90° C., followed by filtration and washing, thereby controlling the cobalt content within 5-40 wt % relative to phosphorus-treated alumina support. Basic precipitants may be used for adjusting pH to 7-8, and the examples of strh basic precipitants include sodium carbonate, potassium carbonate, ammonium carbonate and ammonium hydroxide solution. The ageing time of catalyst is 0.1-10 hours, preferably 0.5-8 hours, because this is advantageous in the preparation of support comprising active cobalt. When the time is less than 0.1 hours, it is disadvantageous in F-T reaction because the dispersion of cobalt decreases. When the time is more than 10 hours, it is economically disadvantageous due to extended synthesis time because the particle size of cobalt increases, while the number of active sites decreases. Cobalt-supported F-T catalyst is prepared by washing and drying the cobalt/phosphorus-alumina catalyst prepared according to the aforementioned method. Precipitates prepared above are washed and dried in an oven of 100° C. for a day, and may be used either directly in the synthesis of catalyst for F-T reaction or after the impregnation of noble metal catalyst component and calcination.

Any conventional cobalt precursor may be used in the present invention. Examples of the cobalt precursor include nitrate, acetate, chloride and a mixture thereof. In this case, catalyst promoters such as rhenium, ruthenium and platinum may additionally be used in the amount of 0.05-1 wt % relative to the support for achieving superior activity of catalyst.

When the calcination temperature is lower than 200° C., particle size may increase during the reaction due to insufficient interaction between cobalt and support. When the temperature is higher than 600° C., catalyst activity may decrease because the particle size of cobalt and the inactive cobalt aluminate formation increases and dispersion decreases.

Such cobalt/phosphorus-alumina catalyst comprises 5-40 wt % of cobalt relative to phosphorus-alumina support. Less than 5 wt % may be insufficient for achieving F-T reactivity. When the amount is more than 40 wt %, it becomes less economical due to increase in manufacturing cost.

Furthermore, according to the present invention, liquid hydrocarbon is prepared by conducting F-T reaction using synthesis gas in the presence of thus prepared catalyst. The F-T reaction refers to the one that is conventionally conducted. The catalyst is used in the present invention after it is reduced at 200-700° C. under hydrogen conditions. Thus reduced catalyst for F-T reaction is used in fixed-bed, fluidized-bed and slurry reactor under the conditions employed in the F-T reaction, for example without limitation, specifically at 200-400° C., 5-50 kg/cm$^2$ and a space velocity of 500-10000 h$^{-1}$.

EXAMPLES

The present invention will be described based on the following Examples. However, the present invention is not limited by following Examples.

Example 1

For the preparation of phosphorus-containing alumina with a high surface area by a sol-gel method, aluminum isopropoxide was mixed in 2-propanol solution to prepare slurry. During the preparation of amorphous aluminum hydroxide by adding acetic acid and water in the slurry for hydrolysis, phosphoric acid($H_3PO_4$) was added in such an amount as to adjust the molar ratio of P/Al to 0.01. Slurry solution was prepared by controlling the molar ratio of aluminum isopropoxide:2-propanol:acetic acid:water to 1:25:0.1:3. Thus prepared slurry solution was vacuum dried by means of reflux in a flask of 90° C. for more than 24 hours, followed by drying in a drier of 100° C. for more than 24 hours, thus providing phosphorus-containing boehmite powders. The phosphorus-containing boehmite powders were calcined at 500° C. for 5 hours, thus preparing phosphorus-containing alumina with a high surface area. Thus prepared phosphorus-alumina support showed a specific surface area of 380 m$^2$/g.

A solution of cobalt nitrate, $Co(NO_3)_2 6H_2O$ (3.1 g) in ethanol (60 ml) was added in the phosphorus-alumina support (3 g) as cobalt precursor, and the mixture was stirred at room temperature for more than 12 hours, thus providing cobalt/phosphorus-alumina catalyst. The powders were dried at 100° C. for more than 12 hours, and calcined in air of 500° C. for 5 hours. The cobalt/phosphorus-alumina catalyst was ascertained to comprise 20 wt % of Co/0.6 wt % of P-(γ-$Al_2O_3$) (P/Al=0.01 mole/mole) relative to metal, and a specific surface area of 248 m$^2$/g.

Catalyst (0.3 g) was introduced into a ½ inch stainless fixed-bed reactor, and reduced for 12 hours under 400° C. hydrogen condition (5 vol % $H_2$/95 vol % He). Reactants were introduced into the reactor while maintaining the molar ratio of carbon monoxide:hydrogen:carbon dioxide:argon (internal standard material) to 28.4:57.3:9.3:5 under the conditions of 220° C. and 20 kg/cm$^2$ and at the space speed of 2000 L/kgcat/hr, and F-T reaction was conducted. Results were obtained 60 hours on stream, when catalyst activity was maintained stable, and the average values for 10 h are provided in Table 1.

Example 2

Phosphorus-alumina support was prepared the same as in Example 1 except that the molar ratio of P/Al was maintained to 0.02. The specific surface area of the phosphorus-alumina support was 365 m$^2$/g.

Cobalt nitrate ($Co(NO_3)_2 6H_2O$) was impregnated onto the phosphorus-alumina support. Thus prepared catalyst was ascertained to comprise 20 wt % Co/1.2 wt % P-(γ-$Al_2O_3$) (P/Al=0.02 mole/mole), and showed the specific surface area of 247 m$^2$/g.

Catalyst was reduced as in Example 1, and F-T reaction was conducted. Results were obtained 60 hours on stream, when catalyst activity was maintained stable, and the average values for 10 h are provided in Table 1.

Example 3

Phosphorus-alumina support was prepared the same as in Example 1 except that the molar ratio of P/Al was maintained to 0.05. The specific surface area of the phosphorus-alumina support was 340 m$^2$/g.

Cobalt nitrate (Co(NO$_3$)$_2$6H$_2$O) was impregnated onto the phosphorus-alumina support. Thus prepared catalyst was ascertained to comprise 20 wt % Co/3.0 wt % P-(γ-Al$_2$O$_3$) (P/Al=0.05 mole/mole), and showed the specific surface area of 231 m$^2$/g.

Catalyst was reduced as in Example 1, and F-T reaction was conducted. Results were obtained 60 hours on stream, when catalyst activity was maintained stable, and the average values for 10 h are provided in Table 1.

Example 4

Phosphorus-alumina support was prepared the same as in Example 1 except that the molar ratio of P/Al was maintained to 0.1. The specific surface area of the phosphorus-alumina support was 326 m$^2$/g.

Cobalt nitrate (Co(NO$_3$)$_2$6H$_2$O) was impregnated onto the phosphorus-alumina support. Thus prepared catalyst was ascertained to comprise 20 wt % Co/6.1 wt % P-(γ-Al$_2$O$_3$) (P/Al=0.1 mole/mole), and showed the specific surface area of 194 m$^2$/g.

Catalyst was reduced as in Example 1, and F-T reaction was conducted. Results were obtained 60 hours on stream, when catalyst activity was maintained stable, and the average values for 10 h are provided in Table 1.

Example 5

Reaction was conducted the same as in Example 1 except that the reaction conditions were maintained at 240° C., 20 kg/cm$^2$ and a space speed of 2000 L/kgcat/hr. Results were obtained 60 hours on stream, when catalyst activity was maintained stable, and the average values for 10 h are provided in Table 1.

Example 6

Reaction was conducted the same as in Example 2 except that the reaction conditions were maintained at 240° C., 20 kg/cm$^2$ and a space speed of 2000 L/kgcat/hr. Results were obtained 60 hours on stream, when catalyst activity was maintained stable, and the average values for 10 h are provided in Table 1.

Example 7

Reaction was conducted the same as in Example 3 except that the reaction conditions were maintained at 240° C., 20 kg/cm$^2$ and a space speed of 2000 L/kgcat/hr. Results were obtained 60 hours on stream, when catalyst activity was maintained stable, and the average values for 10 h are provided in Table 1.

Example 8

Reaction was conducted the same as in Example 4 except that the reaction conditions were maintained at 240° C., 20 kg/cm$^2$ and a space speed of 2000 L/kgcat/hr. Results were obtained 60 hours on stream, when catalyst activity was maintained stable, and the average values for 10 h are provided in Table 1.

Example 9

Reaction was conducted as in Example 3 except that catalyst was air-calcined at 700° C. for 5 hours, and the catalyst was ascertained to have specific surface area of 153 m$^2$/g. Catalyst (0.3 g) was introduced into a 1⁄2 inch stainless fixed-bed reactor, and reduced for 12 hours under 400° C. hydrogen condition (5 vol % H$_2$/95 vol % He) before F-T reaction was conducted under the conditions of 240° C. and 20 kg/cm$^2$ and at the space speed of 2000 L/kgcat/hr. Results were obtained 60 hours on stream, when catalyst activity was maintained stable, and the average values for 10 h are provided in Table 1.

Comparative Example 1

Impregnation Method

Commercially available alumina support (3 g, STREM specific surface area=200 dig) and cobalt nitrate (Co(NO$_3$)$_2$6H$_2$O, 3.1 g, cobalt precursor) were dissolved in 60 ml of deionized water, and stirred at room temperature for more than 12 hours to provide cobalt/alumina catalyst. The powders were dried at 100° C. for more than 12 hours, and air-calcined at 400° C. for 5 hours. The catalyst was ascertained to have a specific surface area of 140 m$^2$/g, and comprise 20 wt % Co/γ-Al$_2$O$_3$ relative to metal.

Catalyst (0.3 g) was introduced into a 1⁄2 inch stainless fixed-bed reactor, and reduced for 12 hours under 400° C. hydrogen condition (5 vol % H$_2$/95 vol % He). Reactants were introduced into the reactor while maintaining the molar ratio of carbon monoxide:hydrogen:carton dioxide:argon (internal standard material) to 28.4:57.3:9.3:5 under the conditions of 220° C. and 20 kg/cm$^2$ and at the space speed of 2000 L/kgcat/hr, and F-T reaction was conducted. Results were obtained 60 hours on stream, when catalyst activity was maintained stable, and the average values for 10 h are provided in Table 1.

Comparative Example 2

Impregnation Method

Catalyst was prepared as in Comparative Example 1 except that phosphorus-alumina support was prepared by using 5 g of alumina support with specific surface area of 198 m$^2$/g (CATAPAL B, SASOL) and 0.37 g of phosphoric acid (H$_3$PO$_4$).

The phosphorus-alumina support (3 g) and cobalt nitrate (Co(NO$_3$)$_2$6H$_2$O, 3.1 g, cobalt precursor) were dissolved in 60 ml of deionized water, and stirred at room temperature for more than 12 hours to provide cobalt/alumina catalyst. The powders were dried at 100° C. for more than 12 hours, and air-calcined at 400° C. for 5 hours. The catalyst was ascertained to have a specific surface area of 156 m$^2$/g, and comprise 20 wt % Co2 wt % P/γ-Al$_2$O$_3$ relative to metal.

Catalyst (0.3 g) was introduced into a 1⁄2 inch stainless fixed-bed reactor, and reduced for 12 hours under 400° C. hydrogen condition (5 vol % H$_2$/95 vol % He). Reactants were introduced into the reactor while maintaining the molar ratio of carbon monoxide:hydrogen:carton dioxide:argon (internal standard material) to 28.4:57.3:9.3:5 under the conditions of 220° C. and 20 kg/cm$^2$ and at the space speed of 2000

L/kgcat/hr, and F-T reaction was conducted. Results were obtained 60 hours on stream, when catalyst activity was maintained stable, and the average values for 10 h are provided in Table 1.

Comparative Example 3

Impregnation Method

Catalyst was prepared as in Comparative Example 1 except that phosphorus-alumina support was prepared by using 5 g of commercially available alumina (STREM, specific surface area=200 m$^2$/g) and 0.93 g of phosphoric acid ($H_3PO_4$).

The phosphorus-alumina support (3 g) and cobalt nitrate ($Co(NO_3)_2 6H_2O$, 3.1 g, cobalt precursor) were dissolved in 60 ml of deionized water, and stirred at room temperature for more than 12 hours to provide cobalt/alumina catalyst. The catalyst was ascertained to have a specific surface area of 36 m$^2$/g, and comprise 20 wt % Co/5 wt % P/γ-$Al_2O_3$ relative to metal.

Catalyst (0.3 g) was introduced into a 12 inch stainless fixed-bed reactor, and reduced for 12 hours under 400° C. hydrogen condition (5 vol % $H_2$/95 vol % He). Reactants were introduced into the reactor while maintaining the molar ratio of carbon monoxide:hydrogen:carbon dioxide:argon (internal standard material) to 28.4:57.3:9.3:5 under the conditions of 220° C. and 20 kg/cm$^2$ and at the space speed of 2000 L/kgcat/hr, and F-T reaction was conducted. Results were obtained 60 hours on stream, when catalyst activity was maintained stable, and the average values for 10 h are provided in Table 1.

Comparative Example 4

Impregnation Method

Catalyst was prepared as in Comparative Example 2 except that F-T reaction was conducted at 240° C., 20 kg/cm$^2$ and a space speed of 2000 L/kgcat/hr. Results were obtained 60 hours on stream, when catalyst activity was maintained stable, and the average values for 10 h are provided in Table 1.

Comparative Example 5

Impregnation Method

Catalyst was prepared as in Comparative Example 3 except that F-T reaction was conducted at 240° C., 20 kg/cm$^2$ and a space speed of 2000 L/kgcat/hr. Results were obtained 60 hours on stream, when catalyst activity was maintained stable, and the average values for 10 h are provided in Table 1.

Comparative Example 6

Co-Precipitation Method

Aluminum nitrate ($Al(NO_3)_3 9H_2O$, 60.0 g) and phosphoric acid ($H_3PO_4$, 0.09 g) were dissolved in 400 mL of deionized water, thus providing a solution of pH 5.5. Sodium carbonate($Na_2CO_3$, 26.4 g) was dissolved in 400 mL of deionized water as an precipitating agent, and pH was 10.5. The two kinds of solution were slowly introduced into a flask (2000 mL), where 200 mL of deionized water was stirred at 70° C., and pH was maintained to about 7.5-8.0. The slurry solution was stirred at 70° C. for 3 hours, and thus-prepared hybrid catalyst was washed with 2000 mL of deionized water more than three times, filtered and dried. The ratio of P/Al was 0.01, and the phosphorus-containing boehmite powders were calcined at 500° C. for 5 hours, thus providing phosphorus-alumina support.

Thus prepared phosphorus-alumina support (3 g) and cobalt nitrate ($Co(NO_3)_2 6H_2O$, cobalt precursor, 3.1 g) were dissolved in 60 mL of ethanol, and stirred at room temperature for more than 12 hours, thus providing supported catalyst. The powders were dried at 100° C. for more than 12 hours, and air-calcined at 500° C. for 5 hours. The composition of the catalyst is 20 wt % Co/0.6 wt % P-(γ-$Al_2O_3$) (P/Al=0.01 mole/mole) relative to metal, and the specific surface area is 178 m$^2$/g.

Catalyst (0.3 g) was introduced into a 12 inch stainless fixed-bed reactor, and reduced for 12 hours under 400° C. hydrogen condition (5 vol % $H_2$/95 vol % He). Reactants were introduced into the reactor while maintaining the molar ratio of carbon monoxide:hydrogen:carbon dioxide:argon (internal standard material) to 28.4:57.3:9.3:5 under the conditions of 220° C. and 20 kg/cm$^2$ and at the space speed of 2000 L/kgcat/hr, and F-T reaction was conducted. Results were obtained 60 hours on stream, when catalyst activity was maintained stable, and the average values for 10 h are provided in Table 1.

Comparative Example 7

Catalyst was prepared as in Comparative Example 6 except that F-T reaction was conducted at 240° C., 20 kg/cm$^2$ and a space speed of 2000 L/kgcat/hr. Results were obtained 60 hours on stream, when catalyst activity was maintained stable, and the average values for 10 h are provided in Table 1.

Comparative Example 8

Phosphorus-alumina support was prepared as in Example 1 except that P/Al molar ratio was maintained to 0.5, and the specific surface area of the phosphorus-alumina support is 185 m$^2$/g. Catalyst was prepared by impregnating cobalt nitrate ($Co(NO_3)_2 6H_2O$) onto the phosphorus-alumina support. The composition of thus prepared catalyst is 20 wt % Co/30.4 wt % P-(γ-$Al_2O_3$) (P/Al=0.5 mole/mole), and the specific surface area is 120 m$^2$/g.

F-T reaction was conducted after a reducing process was conducted as in Example 1. Results were obtained 60 hours on stream, when catalyst activity was maintained stable, and the average values for 10 h are provided in Table 1.

Comparative Example 9

Experimental procedure was the same with Comparative Example 4 except that catalyst was calcined at 700° C. for 5 hours. Catalyst (0.3 g) was introduced into a 12 inch stainless fixed-bed reactor, and reduced at 400° C. under hydrogen condition (5 vol % $H_2$/95 vol % He) for 12 hours. F-T reaction was conducted at 240° C., 20 kg/cm$^2$ and a space speed of 2000 L/kgcat/hr. Results were obtained 60 hours on stream, when catalyst activity was maintained stable, and the average values for 10 h are provided in Table 1.

Table 1 shows the results of F-T reaction conducted in the presence of catalyst prepared by using supports in Examples 1-9 and Comparative Example 1-9.

TABLE 1

| Examples | CO conversion (carbon mole %) | Selectivity $C_1/C_2-C_4/C_5$ or higher (carbon mole %) | Yield $C_5$ or higher (%) | BET specific surface area of phosphorus-alumina support (m²/g) | BET specific surface area of catalyst (m²/g) | Specific surface areal ratio of catalyst ($SA_1/SA_2$) |
|---|---|---|---|---|---|---|
| Ex. 1 | 20.5 | 13.6/13.4/73.0 | 15.0 | 380 | 248 | 7.73 |
| Ex. 2 | 21.8 | 13.0/10.6/76.4 | 16.7 | 365 | 247 | 6.14 |
| Ex. 3 | 31.2 | 7.4/10.1/82.5 | 25.7 | 340 | 231 | 5.48 |
| Ex. 4 | 31.6 | 8.4/11.4/80.2 | 25.3 | 326 | 194 | 5.52 |
| Ex. 5 | 39.3 | 18.6/14.4/67.0 | 26.3 | | | |
| Ex. 6 | 39.6 | 19.0/14.7/66.3 | 26.3 | | | |
| Ex. 7 | 55.3 | 10.3/13.1/76.6 | 42.4 | | | |
| Ex. 8 | 65.1 | 10.3/12.4/77.3 | 50.3 | | | |
| Ex. 9 | 30.9 | 7.3/10.8/81.9 | 25.3 | 238 | 153 | 6.41 |
| Com. Ex. 1 | 19.2 | 18.9/16.6/64.5 | 12.4 | — | 140 | — |
| Com. Ex. 2 | 23.0 | 23.0/17.3/59.7 | 13.7 | — | 152 | — |
| Com. Ex. 3 | 6.1 | 29.2/32.6/38.2 | 2.3 | — | 36 | — |
| Com. Ex. 4 | 41.8 | 27.0/17.5/55.5 | 23.2 | | | |
| Com. Ex. 5 | 29.9 | 21.1/20.3/58.6 | 17.5 | | | |
| Com. Ex. 6 | 2.9 | 3.6/4.6/91.8 | 2.7 | — | 147 | — |
| Com. Ex. 7 | 10.0 | 12.4/14.0/73.6 | 7.4 | | | |
| Com. Ex. 8 | 19.2 | 13.3/16.9/69.8 | 13.4 | 185 | 120 | 3.12 |
| Com. Ex. 9 | 26.1 | 14.6/12.3/73.1 | 19.1 | — | 135 | — |

As shown in Table 1, Examples 1-9 where cobalt-based catalyst is prepared by using phosphorus-alumina with sol-gel method, is superior to Comparative Example 1-5, where catalyst is prepared by using the commercially available alumina in the view of selectivity to liquid hydrocarbon and conversion of carbon monoxide in F-T reaction.

Furthermore, F-T catalyst prepared by using phosphorus-containing alumina according to Examples showed porous bimodal pore size distribution, and the specific surface areal ratio [$SA_1/SA_2$] of relatively smaller pores ($SA_1$, 1-20 nm) to relatively larger pores ($SA_2$, 21-200 nm) was in the range of 5-10. When the ratio of [$SA_1/SA_2$] is in the aforementioned range, F-T reaction reactivity was superior because the dispersion of cobalt species increases due to the appropriate existence of relatively smaller pores. In addition, the thermal stability and facile mass transfer is achieved due to the modification of alumina support by phosphorus and porous bimodal pore size distribution of the phosphorus-alumina support.

Figure 1:
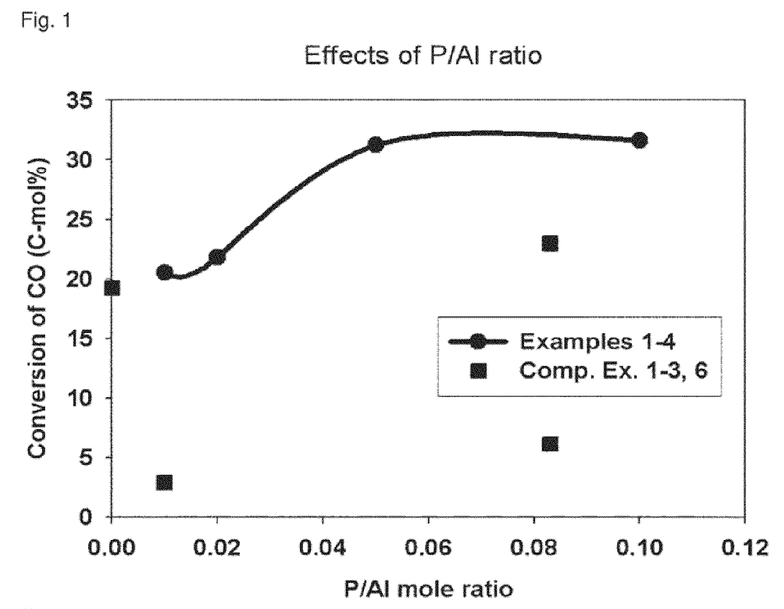
FIG. 1 shows the conversion of carbon monoxide depending on phosphorus content in the F-T reaction conducted on catalysts prepared by using the supports of Examples 1-4 and Comparative Examples 1-3 and 6.

As shown in FIG. 1 and Examples 1-4, when an active ingredient (cobalt component) was supported onto phosphorus-alumina support prepared by a sol-gel method and used in F-T reaction, selectivity to liquid hydrocarbon and conversion of carbon monoxide was ascertained to rise as the ratio of phosphorus to alumina (P/Al) in the range of 0.01 to 0.1 mole/mole. However, the ratio of phosphorus to alumina is too high as in Comparative Example 8 [P/Al=0.5 molar ratio (30.4 wt %)], F-T reactivity decreases because the specific surface area of phosphorus-alumina is remarkably decreased. Further, when alumina support comprising excess phosphorus is used, F-T reactivity was lowered too because the portion of micro-pores of 1-20 nm and dispersion of cobalt decrease.

Comparative Example 6-7, where phosphorus is impregnated according to a co-precipitation method, shows less F-T reactivity than Examples according to a sol-gel method. This is because the co-precipitation method is of no help to form porous bimodal pore size distribution of support, and dispersion of cobalt decreases particularly due to the decrease in specific surface area of support.

Figure 2:
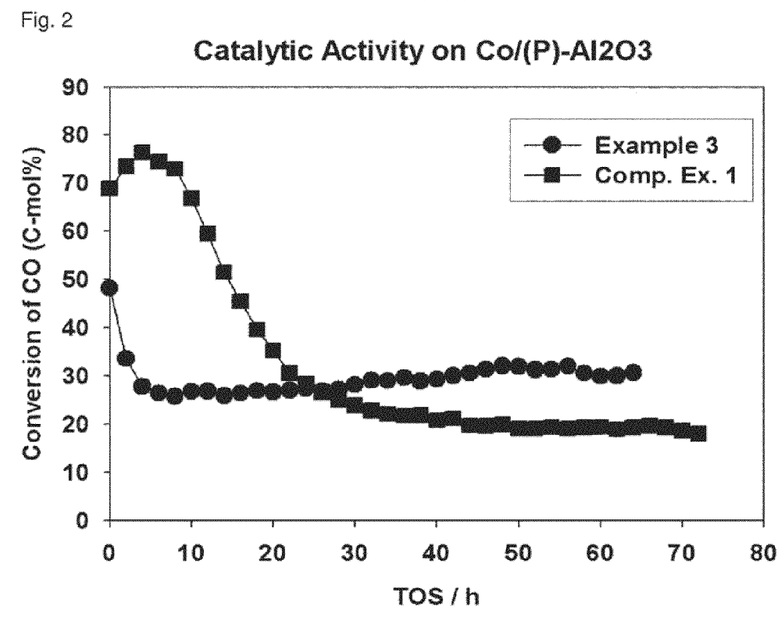
FIG. 2 shows the conversion of carbon monoxide with time-on-stream (TOS) in F-T reaction conducted on catalysts prepared by using the phosphorus-alumina support of Example 3 (sol-gel method) and the alumina support of Comparative Example 1.

FIG. 2 compares between Example 3 where phosphorus-alumina support is used and Comparative Example 1 where only alumina is used as support. As a result of F-T reaction using these supports, hydrothermal stability of phosphorus-alumina support increases and the change in surface property of alumina due to the generated water during F-T reaction decreases, thereby suppressing catalyst deactivation and improving long-term stability.

Further, deactivated catalyst was calcined at 700° C. and applied to F-T reaction as shown in Example 9 and Comparative Example 9. Example 9 where catalyst is prepared according to a sol-gel method, shows relatively low variation in catalytic activity. In contrast, Comparative Example 9 where commercially available alumina is used, shows relatively high variation in catalytic activity, and conversion and selectivity to liquid hydrocarbon decreases. This is related mainly to high-temperature stability of cobalt on the phosphorus-alumina support, and appears due to the fact that catalyst of the present invention shows less sintering phenomenon of cobalt species at high temperature.

Figure 3:
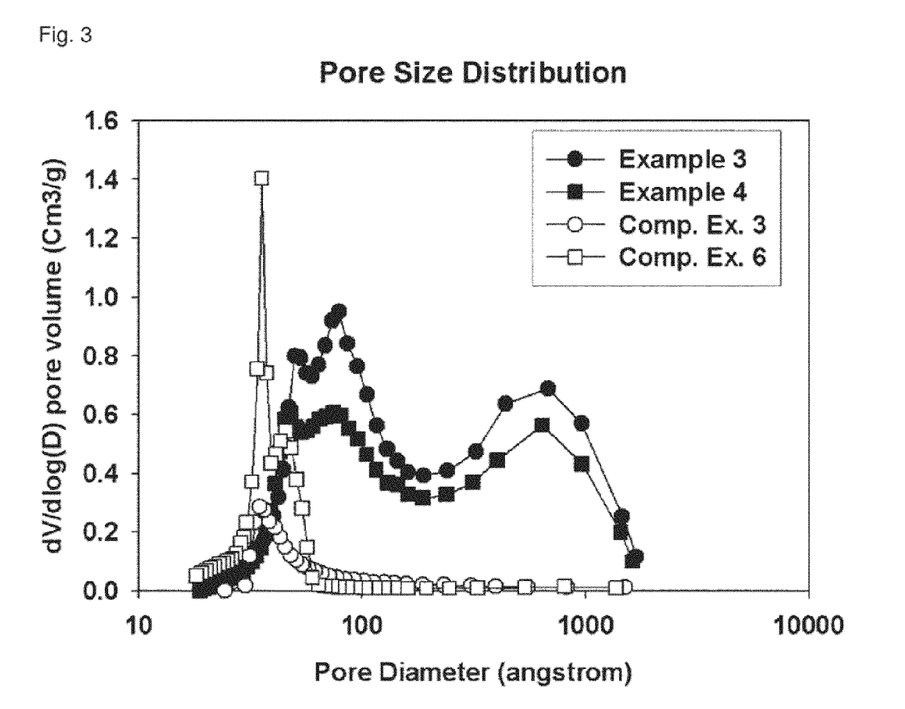
FIG. 3 shows the pore size distribution of catalysts prepared by using the phosphorus-alumina support of Examples 3 and 4 (sol-gel method), the commercially available alumina of Comparative Example 3 and the phosphorus-alumina support of Comparative Example 6 (co-precipitation method).

FIG. 3 shows the pore size distribution of F-T catalysts prepared by using the phosphorus-alumina support of the present invention (Examples 3 and 4), the commercially available alumina support (Comparative Example 3) and supports prepared by a co-precipitation method (Comparative Example 6). Micro-pores having porous bimodal pore size distribution are observed only in the catalyst of the present invention. In particular, it was ascertained that F-T reactivity is superior when the ratio of specific surface area [$SA_1/SA_2$] is within the range of 5-10. This is because of the enhanced cobalt dispersity, thermal stability and facile mass transfer and hydrothermal stability of phosphorus-alumina support, when the phosphorus-containing alumina support having the aforementioned properties is used to conduct F-T reaction, thereby decreasing change in alumina surface property due to the generated water during the F-T reaction and reducing the catalytic deactivation by increasing stability of cobalt.

INDUSTRIAL APPLICABILITY

In developing GTL technique to meet the situation of the recent escalating price of oil, the improvement of a catalyst for F-T synthesis is closely related to the increasing the competitiveness of GTL technique. In particular, the improved catalyst can increase heat efficiency in GTL process and in carbon utilization and can also optimize the F-T reaction process. Thus, a phosphorus-alumina support prepared by a

The invention claimed is:

1. A cobalt-based catalyst for Fischer-Tropsch (F-T) synthesis, in which cobalt is supported on a phosphorus-alumina support, the catalyst made by:

preparing an aluminum alkoxide solution by mixing an aluminum alkoxide in an alcohol-based organic solvent;

preparing a phosphorus-containing boehmite sol by mixing 0.01-1 moles of an organic carboxylic acid with pKa of 3.5-5 and 2-12 moles of water relative to one mole of the aluminum alkoxide in the aluminum alkoxide solution relative to one mole of the aluminum and adding 0.001-0.4 moles of a phosphorus precursor, followed by heating the solution at 80-130° C.;

preparing a powdery phosphorus-containing boehmite by distilling and drying the phosphorus-containing boehmite sol to separate and recover alcohol;

preparing a phosphorus-alumina support by calcining the powdery boehmite at 300-800° C.; the phosphorus-alumina support having bimodal pore size distribution including smaller pores and larger pores; and adding cobalt precursor solution to the phosphorus-alumina support to make the cobalt-based catalyst with 5-40 wt % of cobalt content;

wherein the phosphorus-alumina support has a specific surface area of 300-500 $m^2/g$ and an area ratio [$SA_1/SA_2$] of 5-10, wherein the $SA_1$ is a specific surface area of the smaller pores and the $SA_2$, is a specific surface area of the larger pores, the smaller pores being 1-20 nm and the larger pores being 21-200 nm.

2. The cobalt-based catalyst according to claim 1, wherein the catalyst is made by:

selecting an organic carboxylic acid having a pKa of 3.5-5 from the group consisting of formic acid, acetic acid, propionic acid, and mixtures thereof;

preparing a phosphorus-containing boehmite sol by mixing 0.01-1 moles of the selected organic carboxylic acid and 2-12 moles of water relative to one mole of the aluminum alkoxide in the aluminum alkoxide solution relative to one mole of the aluminum in a mixture;

adding 0.001-0.4 moles of a phosphorus precursor to the mixture; and heating the mixture at 80-130° C.

* * * * *

UNITED STATES PATENT AND TRADEMARK OFFICE
CERTIFICATE OF CORRECTION

PATENT NO. : 8,598,066 B2
APPLICATION NO. : 12/594695
DATED : December 3, 2013
INVENTOR(S) : Bae et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 710 days.

Signed and Sealed this
Twenty-second Day of September, 2015

Michelle K. Lee
*Director of the United States Patent and Trademark Office*